Nov. 17, 1970    C. VAN DER LELY    3,540,195
MOWING MACHINES

Filed Jan. 22, 1968    2 Sheets-Sheet 2

INVENTOR
CORNELIS VAN DER LELY
BY
Mason, Mason & Albright
Attorneys

United States Patent Office 3,540,195
Patented Nov. 17, 1970

3,540,195
MOWING MACHINES
Cornelis van der Lely, 7 Bruschenrain,
Zug, Switzerland
Filed Jan. 22, 1968, Ser. No. 699,514
Claims priority, application Netherlands, Jan. 24, 1967,
6701059
Int. Cl. A01d 35/02
U.S. Cl. 56—23                                       10 Claims

ABSTRACT OF THE DISCLOSURE

This invention relates to mowing machines of the kind having a mobile supporting frame carrying two similar cutting mechanisms in side-by-side relationship. Each cutting mechanism includes a conveyor having portions arranged to displace cut crop transversely of the direction of travel of the machine towards central regions of said mechanisms. During operation of the machine, swaths of cut crop are formed at opposite sides of said supporting frame.

---

Figure 1:
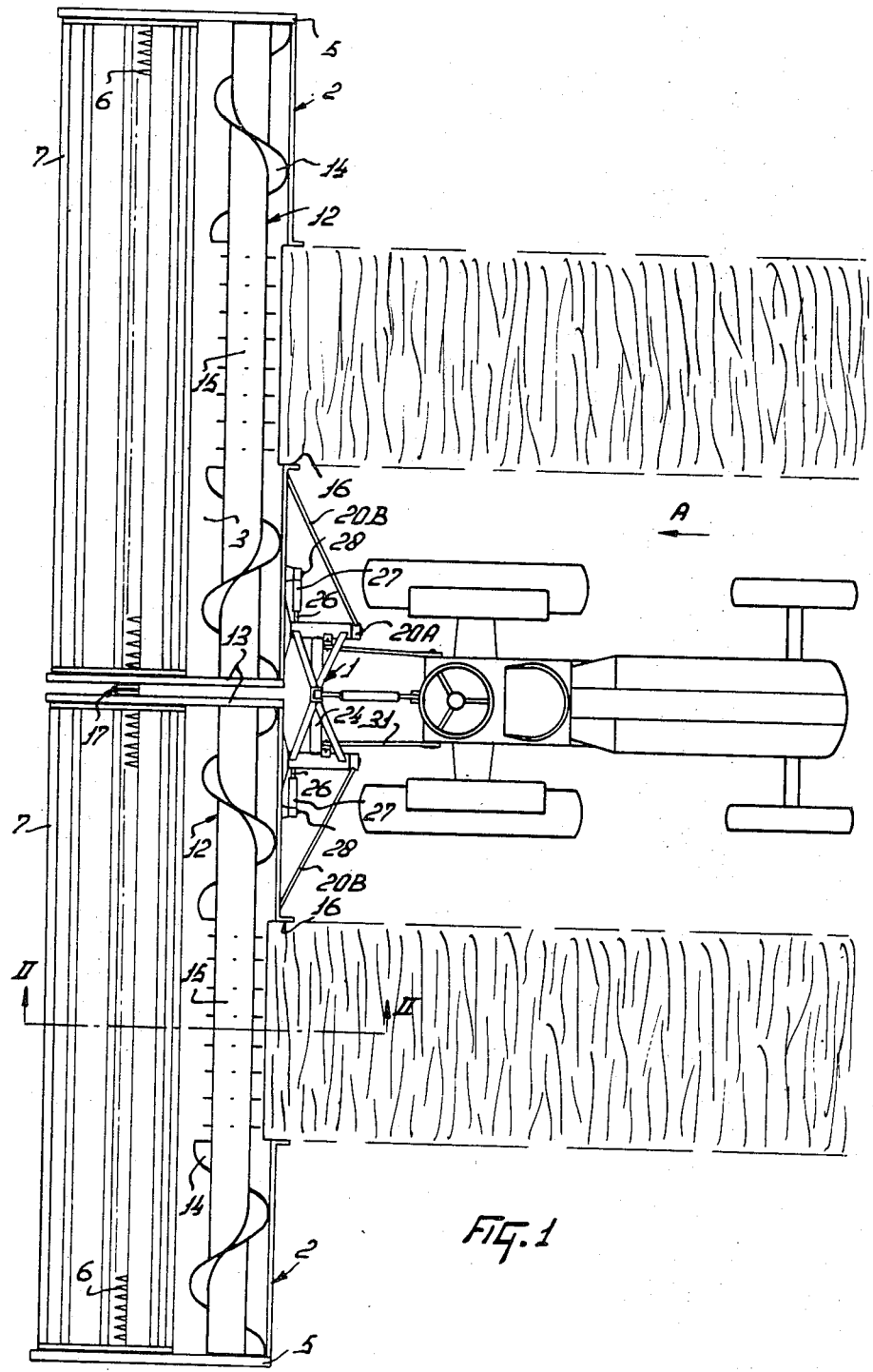
Figure 2:
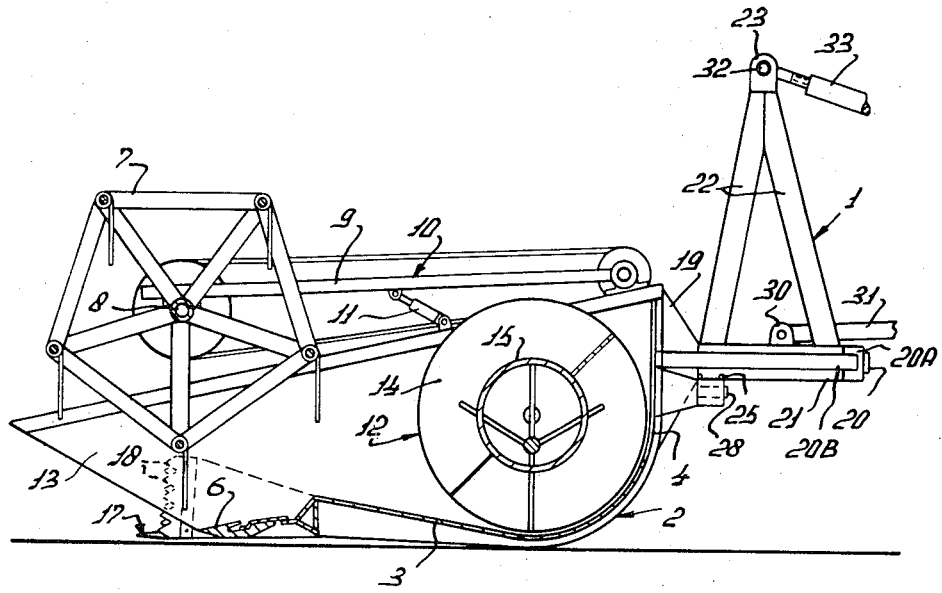
Figure 3:
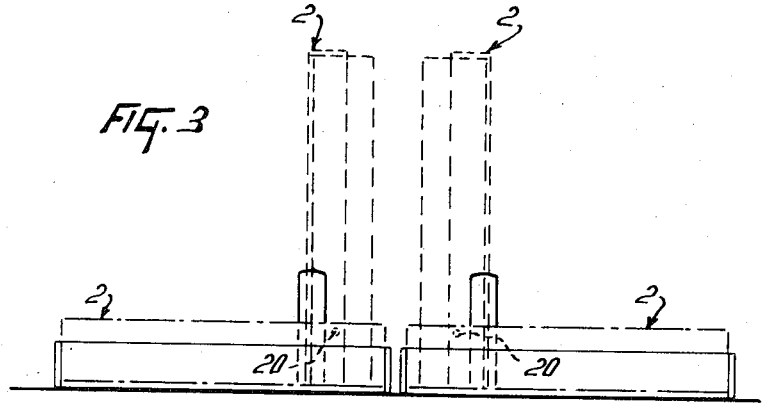

For a better understanding of the invention, and to show how the same may be carried into effect, reference will now be made, by way of example, to the accompanying drawings, in which:

FIG. 1 is a plan view of an agricultural swath-forming mowing machine in accordance with the invention coupled to the three-point lifting device or hitch of an agricultural tractor, FIG. 2 is a section, to an enlarged scale, taken on the line II—II of FIG. 1, and FIG. 3 is a diagrammatic view illustrating the non-operative transport position of the machine.

Referring to the drawings, the agricultural mowing machine which is illustrated is a swath-forming machine having two substantially symmetrically identical cutting mechanisms 2 mounted on a common supporting frame 1. In view of the identity between the two cutting mechanisms 2, it is only necessary to describe one of them in detail. The cutting mechanism 2 has a mowing platform 3 which merges rearwardly into an upright rear wall 4. The end of the cutting mechanism 2 that is remote from the center of the machine has a substantially vertically upright side or end wall 5 a foremost region of which, relative to the intended direction of operative travel of the machine which is indicated by an arrow A in FIG. 1 of the drawings, is formed as a crop divider. This feature cannot be seen in the drawings. The leading edge of the platform 3 carries a substantially horizontally disposed cutter bar 6 above which a reel 7 is mounted so as to be rotatable about the axis of a substantially horizontal shaft 8 that extends more or less parallel to the length of the cutter bar 6. The shaft 8 is rotatably journalled in bearings carried by the arms 9 of a supporting structure 10 which is itself pivotally connected to rear parts of the mowing platform 3. A hydraulic piston and cylinder assembly 11 pivotally interconnects one arm 9 of the supporting structure 10 and the neighboring side or end wall 5 of the platform 3.

Towards the rear of the mowing platform 3, and behind the cutter bar 6, a rotatable conveyer 12 extends substantially horizontally perpendicular to the direction A, the conveyor 12 being rotatably mounted in the side or end wall of the platform 3 and in a relatively parallel wall 13 thereof that is located at the end of the platform 3 which is located approximately centrally of the machine.

The conveyor 12 has two Archimedean screw auger portions 14 at its opposite ends, the screw blades of said portions being wound in relatively opposite directions, and a central tined portion 15. The tined portion 15 is located centrally of the width of the platform 3 immediately in front of a discharge opening 16 formed in the rear wall 4 of the platform. Two knives 17 are located between the two walls 13 at the center of the machine, each knife 17 being carried by a corresponding one of the two cutting mechanisms 2 and each knife having a substantially vertically movable cutter blade 18.

Towards the center of the machine, the rear wall 4 of each mowing platform 3 is fastened to a corresponding support 19 from which a shaft 20 projects substantially horizontally rearwards. The shafts 20 are surrounded by sleeve bearings 21 which form parts of the supporting frame 1. The ends of the shafts 20 that are remote from the supports 19 are surrounded by short sleeves 20A and beams 20B rigidly connect the sleeves 20A to the rear walls 4 of the two mowing platforms 3. The supporting frame 1 also includes four supporting beams 22 the lowermost ends of which are rigidly secured to the sleeve bearing 21 adjacent the respective leading and rearmost ends of those sleeve bearings. The uppermost ends of the four supporting beams 22 are secured to one another and to a fork 23. It will be evident from the drawings that the four supporting beams 22 extend along the four upwardly incline edges of a pyramid-shaped figure whose base is contained in a plane which also contains the axes of the two sleeve bearings 21. A substantially horizontal beam 24 which is also contained in the plane which has just been mentioned perpendicularly interconnects approximately central regions of the two sleeve bearings 21.

Pairs of lugs 25 project from the sleeve bearings 21 at the ends thereof which are closest to the two supports 19 and the ends of piston rods 26 are pivotally arranged between the lugs 25 of each pair. The opposite ends of substantially horizontally disposed lifting cylinders 27 are turnably mounted on heavy pins 28 which project substantially horizontally rearwards from the rear walls 4 of the two mowing platforms 3. Lugs 30 project upwardly from approximately central regions of the two sleeve bearings 21 and these lugs are arranged for pivotal connection, as shown in the drawings, to the free ends of the lower lifting links 31 of the three-point lifting device or hitch of an agricultural tractor or other supporting vehicle. The limbs of the aforementioned fork 23 project upwardly and a substantially horizontal pin 32 is employed to pivotally connect these limbs to the free end of the upper adjustable lifting link 33 of the three-point lifting device which has just been mentioned.

The lugs 30 and fork 23 are employed to connect the mowing machine to the threepoint device or hitch of a tractor in the manner which has previously been described and the machine is moved over a field of crop in the direction A. As illustrated in the drawings, a tractor may be employed in which the lifting device is conventionally mounted at the normal "rear" of the tractor but in which the steering wheel and driver's seat of the latter can be arranged so that said tractor can travel rearwardly (i.e. in the direction A) for extended periods without difficulty. Although this is convenient, it is emphasised that the use of a tractor of this kind is by no means essential. The power take-off shaft of the tractor is employed to drive the cutter bars 6, the reels 7 and the conveyors 12 but the transmission members which interconnect the power take-off shaft and the movable parts of the machine have not been described nor illustrated for the sake of simplicity.

The two cutting mechanisms 2 are located side-by-side and their cutting bars 6 cut standing crop which is subsequently pushed by the tines of the reels 7 into the reach of the conveyors 12. The Archimedean screw auger portions 14 of the conveyors 12 displace any cut crop which they engage towards the central tined portions 15 of the two conveyors 12 and these tined portions 15 pass this crop, together with crop from the parts of the cutter bars 6 which are in line therewith, through the openings 16 in the rear walls 4 of the mowing platforms 3. The cut crop is thus left lying on the field in the form of the two relatively spaced swaths which are shown diagrammatically in FIG. 1 of the drawings, it being noted that these two swaths are located at relatively opposite sides of the tractor and the frame 1 and that the mowing machine has cleared the crop from the intervening strip of ground over which the tractor must pass. The blades 18 of the two knives 17 cut off standing crop in the narrow central region between the two cutting mechanisms 2 and deliver this cut crop to the two cutter bars 6. This avoids the formation of a narrow central strip of unmown crop.

The swath-forming mowing machine which has been described is of large working width but will, in successive traverses of a field, produce swaths of crop that are substantially uniformly spaced apart from one another. The two cutting mechanisms 2 can match undulations in the ground surface to a considerable extent by turning about the axes of the shafts 20. When the machine is to be transported without performing any mowing operation, the two cutting mechanisms 2 are swung upwardly in relatively opposite directions about the axes of the two shafts 20 to bring them to the approximately vertical positions which are shown diagrammatically in regularly broken lines in FIG. 3 of the drawings. This is accomplished with the aid of the lifting cylinders 27 and it will be seen from FIG. 3 of the drawings that the overall width of the machine is considerably reduced to an extent such that it can be transported along public roads and the like without danger or difficulty. When a tractor of the kind which has been described and illustrated is employed to power the machine, it can be re-arranged to move in its normal "forward" direction (i.e. opposite to the direction A) under the non-operative transport conditions which have just been described. Although a mowing machine which is adapted to be moved and driven by an agricultural tractor or other vehicle has been described, it is noted that it is within the scope of the invention to provided a self-propelled and a self-powered mowing machine.

Having thus described my invention, what I claim as new and desire to secure by Letters Patent of the United States is:

1. A mowing machine comprising a frame and two cutting mechanisms arranged side by side on said frame, each of said cutting mechanisms including mowing means, a reel and a conveyor, said reel being located adjacent said mowing means and in front of said conveyor whereby, during operation, said reel moves cut crop to engagement with said conveyor, substantially vertical knife means positioned between said cutting mechanisms for mowing crop between said mechanisms.

2. A mowing machine as claimed in claim 1, wherein each cutting mechanism includes a platform having a rear wall with a crop discharge opening.

3. A mowing mahine as claimed in claim 1, wherein said frame has connecting means for connection to the lifting device to the rear of an agricultural vehicle.

4. A mowing machine as claimed in claim 1, wherein each of said cutting mechanisms is pivotally connected to said frame and tiltable upwardly relative to said frame about an axis extending substantially parallel to the direction of travel of said machine to a transport position.

5. A mowing machine as claimed in claim 4, wherein the pivotal connections between said cutting mechanisms and said frame are comprised of shafts whereby said machine is connectable to an agricultural vehicle and the axes of said shafts extend between the ground wheels of said vehicle.

6. A mowing machine as claimed in claim, 5, wherein the axes of said shafts are located at opposite sides of coupling points of a lifting device on said vehicle.

7. A mowing machine as claimed in claim 6, wherein said coupling points are located adjacent the centers of said shafts.

8. A mowing machine as claimed in claim 4, wherein a hydraulic lifting cylinder is associated with said frame to provide force for the upward tilting of each cutting mechanism.

9. A mowing machine as claimed in claim 1, wherein each cutting mechanism has a rear opening located substantially centrally therein and through whih cut crop can be deposited on the ground behind said machine.

10. A mowing machine comprising a frame and two cutting mechanisms arranged side by said on said frame, each of said cutting mechanisms including mowing means, a reel and a conveyor, said reel being located adjacent said mowing means and in front of said conveyor whereby during operation said reel moves cut crop into engagement with said conveyor, substantially vertical knife means positioned between said cutting mechanisms, said knife means comprising a knife for each mechanism and each knife including a substantially vertically positioned, movable blade whereby crop is cut between said mechanisms.

References Cited

UNITED STATES PATENTS

| | | | |
|---|---|---|---|
| 3,040,502 | 6/1962 | Smith et al. | 56—6 |
| 3,096,605 | 7/1963 | Claas | 56—23 |
| 3,345,808 | 10/1967 | Van der Lely | 56—6 XR |

FOREIGN PATENTS 840,995  7/1960  Great Britain.

LOUIS G. MANCENE, Primary Examiner

J. A. OLIFF, Assistant Examiner

U.S. Cl. X.R.

56—159